United States Patent
Rasmussen et al.

(10) Patent No.: US 6,608,932 B1
(45) Date of Patent: Aug. 19, 2003

(54) OUTLINE FONT FOR ANALYTICAL ASSESSMENT OF PRINTED TEXT QUALITY

(75) Inventors: D. Rene Rasmussen, Pittsford, NY (US); Edul N. Dalal, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,177

(22) Filed: Nov. 29, 1999

(51) Int. Cl.$^7$ .............. G06K 9/00; G06K 9/46; G06K 9/40; H04N 1/00; H04L 1/22
(52) U.S. Cl. .............. 382/195; 382/112; 382/269; 358/1.11; 358/406; 714/46
(58) Field of Search ............... 382/112, 190, 382/195, 199, 218, 219, 258, 269, 317, 321; 358/1.14, 296, 406, 428, 1.11; 399/8, 15, 31, 1; 714/2, 26, 46

(56) References Cited

U.S. PATENT DOCUMENTS

| | | | |
|---|---|---|---|
| 4,071,911 A | 1/1978 | Mazur | 700/1 |
| 4,086,434 A | 4/1978 | Bocchi | 379/91.01 |
| 4,583,834 A | 4/1986 | Seko et al. | 399/8 |
| 5,038,319 A | 8/1991 | Carter et al. | 714/2 |
| 5,057,866 A | 10/1991 | Hill, Jr. et al. | 399/8 |
| 5,084,875 A | 1/1992 | Weinberger et al. | 714/46 |
| 5,235,652 A * | 8/1993 | Nally | 382/112 |
| 5,365,310 A | 11/1994 | Jenkins et al. | 399/8 |
| 5,510,876 A | 4/1996 | Hayashi et al. | 399/1 |
| 5,510,896 A | 4/1996 | Wafler | 358/296 |
| 5,612,902 A | 3/1997 | Stokes | 702/85 |
| 5,619,307 A | 4/1997 | Machino et al. | 399/11 |
| 5,642,202 A | 6/1997 | Williams et al. | 358/406 |
| 5,680,541 A | 10/1997 | Kurosu et al. | 714/26 |
| 5,694,528 A | 12/1997 | Hube | 358/1.14 |
| 5,748,221 A | 5/1998 | Castelli et al. | 347/232 |
| 5,884,118 A | 3/1999 | Mestha et al. | 399/15 |
| 5,943,063 A * | 8/1999 | Dowling | 345/428 |
| 6,023,525 A | 2/2000 | Cass | 382/162 |
| 6,023,595 A | 2/2000 | Suzuki et al. | 399/31 |

FOREIGN PATENT DOCUMENTS

EP    0 854 632 A2    7/1998

OTHER PUBLICATIONS

Remote Diagnostics Systems, Paul F. Morgan, Xerox Disclosure Journal, vol. 3, No. 3, May/Jun. 1978, pp. 191–192x.
Event–based architecture for real–time fault diagnosis, Real Time Fault Monitoring of Industrial Processes, A.D. Pouliezos & G.S. Staverakakis, Kluwer Academic Publishers, 1994, pp. 284–287.
Fault Diagnosis in Dynamic Systems Using Analytical and Knowledge–based Redundancy—A Survey and Some New Results, Paul M. Frank, Automatica, vol. 26, 90 International Federation of Automatic Control, 1990, pp. 459–474.
Combining Expert System and Analytical Redundancy Concepts for Fault–Tolerant Flight Control, David A. Handelman and Robert F. Stengel, Princeton University, J. Guidance, vol. 12, No. 1, Jan.–Feb. 1989, pp. 39–45.

* cited by examiner

*Primary Examiner*—Mehrdad Dastouri
(74) *Attorney, Agent, or Firm*—Oliff & Berridge, PLC

(57) ABSTRACT

This invention specifically covers one of the many image quality (IQ) metrics that can be part of an overall image quality (IQ) analysis engine. The specific problem with image quality addressed with this metric is that of printed text. Analytical outline font characters are used to represent certain traits of existing text characters, allowing proper image quality analysis while simplifying image processing. Preferably, a set of analytical outline font characters are used, with each representing a different trait.

21 Claims, 5 Drawing Sheets

| AOF character | Times New Roman character | Stress point | Analysis method |
|---|---|---|---|
| | T | Serifs. The AOF character contains a main stem, with small perpendicular lines which simulate serifs. The widths of the stem and of the "serifs", and the length of the "serifs", can be modified to simulate other fonts. | Simple image processing techniques can be used to measure the length and width of the "serifs" on the printed sample. |
| | m | Correct spacing between lines ("stems") and correct "stem" width. The width and spacing of the "stems" in the AOF character can be modified to simulate different characters and different fonts. | Simple image processing can be used to measure: • Optical density of each "stem" • Position of each "stem" relative to each other • Width of each "stem" |
| | r | Thin line between large areas. Many characters contain thin lines connecting larger areas. The thin line may either disappear or grow excessively. The width and length of the connecting line can be modified to simulate different characters and fonts. | Simple image processing can be used to determine whether the connecting line is broken, has grown, or is reproduced correctly. |
| | o | The concentric circles should be reproduced without fill-in, and with constant stroke width. | Simple image processing techniques can be used to analyze: • The area coverage of the character. Too high or too low values would indicate fill-in or thinning. • Presence of moiré patterns, which would indicate uneven stroke widths ("juggies"). |

| AOF character | Times New Roman character | Stress point | Analysis method |
|---|---|---|---|
| (serif I shape) | T | Serifs. The AOF character contains a main stem, with small perpendicular lines which simulate serifs. The widths of the stem and of the "serifs", and the length of the "serifs", can be modified to simulate other fonts. | Simple image processing techniques can be used to measure the length and width of the "serifs" on the printed sample. |
| (vertical stems) | m | Correct spacing between lines ("stems") and correct "stem" width. The width and spacing of the "stems" in the AOF character can be modified to simulate different characters and different fonts. | Simple image processing can be used to measure:<br>• Optical density of each "stem"<br>• Position of each "stem" relative to each other<br>• Width of each "stem" |
| (two blocks with thin line) | r | Thin line between large areas. Many characters contain thin lines connecting larger areas. The thin line may either disappear or grow excessively. The width and length of the connecting line can be modified to simulate different characters and fonts. | Simple image processing can be used to determine whether the connecting line is broken, has grown, or is reproduced correctly. |
| (concentric circles) | O | The concentric circles should be reproduced without fill-in, and with constant stroke width. | Simple image processing techniques can be used to analyze:<br>• The area coverage of the character. Too high or too low values would indicate fill-in or thinning.<br>• Presence of moire patterns, which would indicate uneven stroke widths ("jaggies"). |

*FIG. 5*

OUTLINE FONT FOR ANALYTICAL ASSESSMENT OF PRINTED TEXT QUALITY

BACKGROUND OF THE INVENTION

1. Field of Invention

The invention relates to an image quality analysis system and method that can assess printed text image quality.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems provide some level of image quality analysis, these systems have been found less than satisfactory as image quality determination is machine dependent and may be inconsistent with perceptions of image quality as judged by human users.

Of particular importance in determining overall image quality is resolving problems with printed text quality. The quality of text is one of the most important image quality attributes of a printing system. Being able to analyze these capabilities is essential.

Many printer systems apply special image processing, such as anti-aliasing, to those pieces of images that represent text, while geometric objects such as lines are processed differently and often more simply. The reason for this is that people are visually more sensitive to errors in the rendition of text than of line or similar graphics. Moreover, certain enhancements are meaningful only for text. Thus, in order to optimize processing speed, it is advantageous to apply such enhancement techniques only to fonts.

Text can appear in many formats within a document to be printed. They can be bitmaps, Postscript® Type 3 fonts, or outline fonts (Postscript® Type 1 fonts and TrueType fonts). Outline fonts can often obtain the best printed text quality and are by far the most dominant method for representing text in documents today. Thus, a decision by an image processing system of a printer whether to apply enhancement processing is often made based on whether the object is an outline font. In other words, segments of an image that contain bitmap text will typically be processed as other graphical bitmap objects, without text enhancement, such as anti-aliasing, and only outline font segments are subject to text enhancement.

However, because of the complicated geometrical structure of text, it is difficult to perform image quality analysis directly on text characters. While it is possible to measure error between intended and actual shapes of text characters, interpreting the measurement in terms of how a human observer would perceive the error is difficult. Such interpretations have been somewhat unreliable.

A possible solution would be to conduct measurements on simple graphics objects rather than directly on text characters. However, a printer's image processing may not apply identically to text characters and simple graphics objects. In view of this, results based on such an approach may be misleading. For example, a 400 dpi printer may render lines without anti-aliasing and consequently it would appear from measurements on lines that the printer has severe limitations in terms of accurate line width rendition. Thus, one might expect that such a printer would render text with uneven stroke widths. However, text presented as an outline font may be rendered with anti-aliasing and therefore show nearly perfect apparent stroke width uniformity. Accordingly, in this hypothetical example, it would appear that the printer had an image quality problem when it fact it did not.

In view of this, it would appear that image quality evaluation requires direct evaluation of text. However, due to the complicated geometrical representations of text, such an image quality analysis would not readily be feasible.

SUMMARY OF THE INVENTION

There is a need for image output devices, such as printers and copiers, to better self-diagnose problems relating to image quality. Applicants have found that to comprehensively and reliably measure the system performance of a printer or copier, the image quality of the output must be measured.

Systems that can perform image analysis on printed test samples can be used in a variety of ways to provide solutions and value to users of digital printers and copiers, for example as the analysis engine for automatic and/or remote diagnosis of print quality problems, or for monitoring image quality as part of a print quality assurance system. These systems can be used to accurately measure image quality of printed text.

One exemplary embodiment of the systems and methods of the invention overcomes such problems by developing powerful diagnosing tools within a digital printer or copier for self-diagnosis and evaluation of image quality. Image quality analysis can be performed to monitor many aspects of the printed output of the printing system. Of particular importance to overall image quality is text quality.

In this embodiment, the system provides: one or more digital test patterns stored in memory for providing one or more hard copy output test images; an input scanner that can scan the hard copy test image to form a digital raster image; and an image quality analysis module that receives information about the position of the digital raster image and produces test results relevant to determination of image quality analysis as perceived by human observers, particularly text quality. The input scanner and image quality analysis module may form part of the image output device or may be stand-alone components used to test the device. Optionally, a communication module may be provided that is capable of contacting a service department or a more sophisticated diagnostic module if further analysis or service is necessary, depending on the outcome of the image quality analysis. Alternatively, information relating to text quality may be used by a corrective procedure within the image output device being tested to calibrate the device to correct for detected problems. The image quality analysis and any subsequent corrective procedure should be based on the human visual system (HVS) such that those levels of differences in certain image quality traits that are sufficiently perceived by human observers are considered undesirable image quality degradation. However, even minute differences could be corrected as a preventative measure, even if not visible. A special variation of the human Visual Transfer Function (VTF) may be appropriate to use for text quality, to allow for less than the normal viewing distance (typically 400 mm) to simulate close inspection or the use of a loupe. Factors of human vision, such as the well-known hyperacuity should also be taken into account.

This invention specifically covers one of the many image quality (IQ) metrics that can be part of an overall image quality analysis engine. The specific problem with image quality addressed with this metric is that of printed text.

According to an aspect of the invention, analytical outline fonts are provided that combine the best aspects of graphical objects that are suitable for analytical measurements, while resembling characteristics of real text represented by outline fonts. The key to these analytical characters is that they have less complicated shapes than most real font characters, making it easier to perform image quality analysis.

A series of "analytical characters" are preferably provided, with each being designed to allow easy analytical measurements while providing image quality information useful in assessing particular traits of one or more actual text characters, such as English or Kanji characters in various fonts. Preferably, each analytical font isolates a particular trait.

By making the analytical character in an outline font, the character is processed by the image processing system of the printer as would normal text. As such, its image quality analysis is relevant to image quality analysis of real outline font characters, but without the complicated structure.

BRIEF DESCRIPTION OF THE DRAWINGS

The invention will be described with reference to the following illustrative drawings, wherein like numerals refer to like elements and wherein:

FIG. 5 is a table showing examples of analytical outline font characters.

DETAILED DESCRIPTION OF PREFERRED EMBODIMENTS

Figure 1:
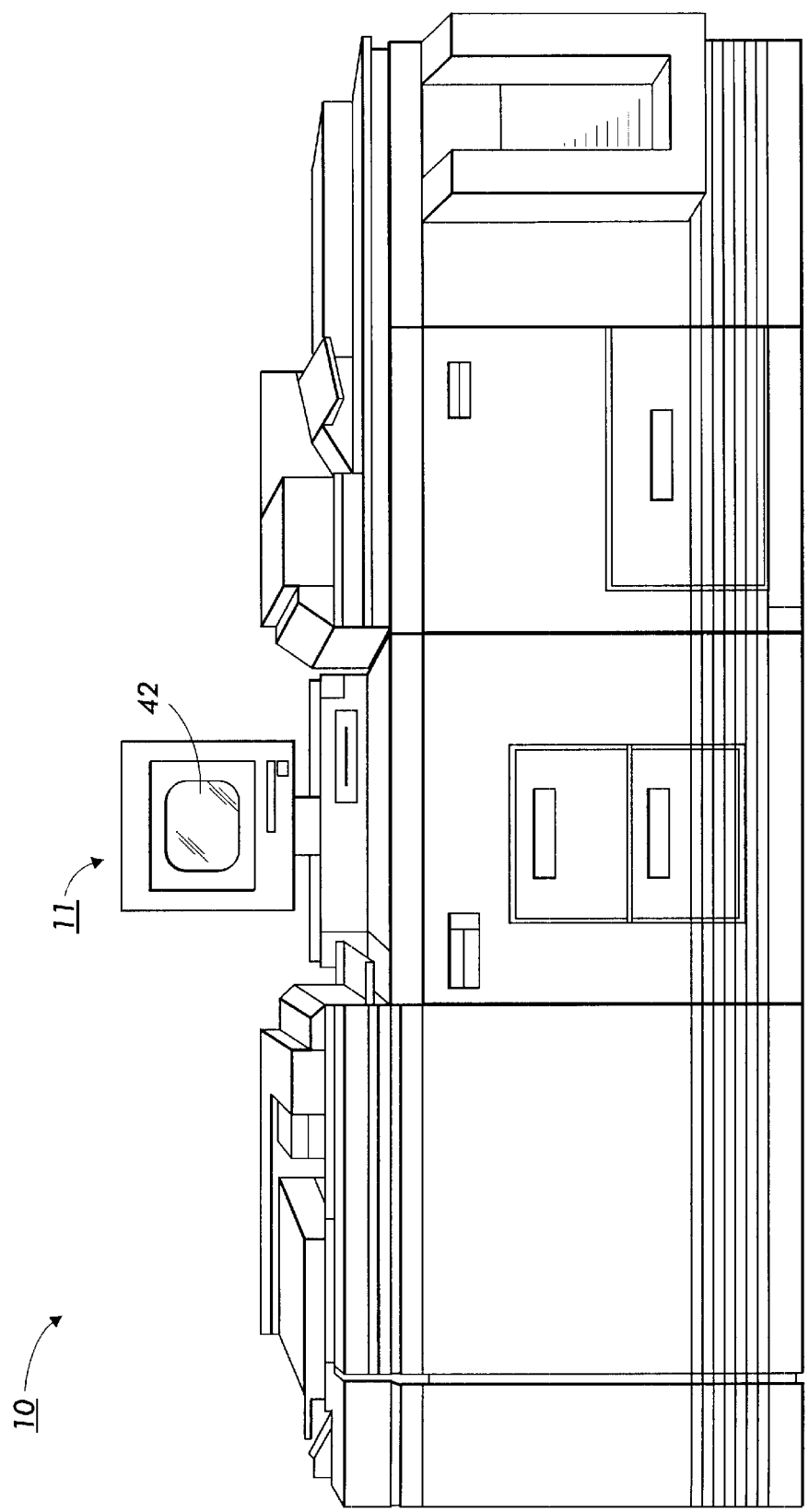
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
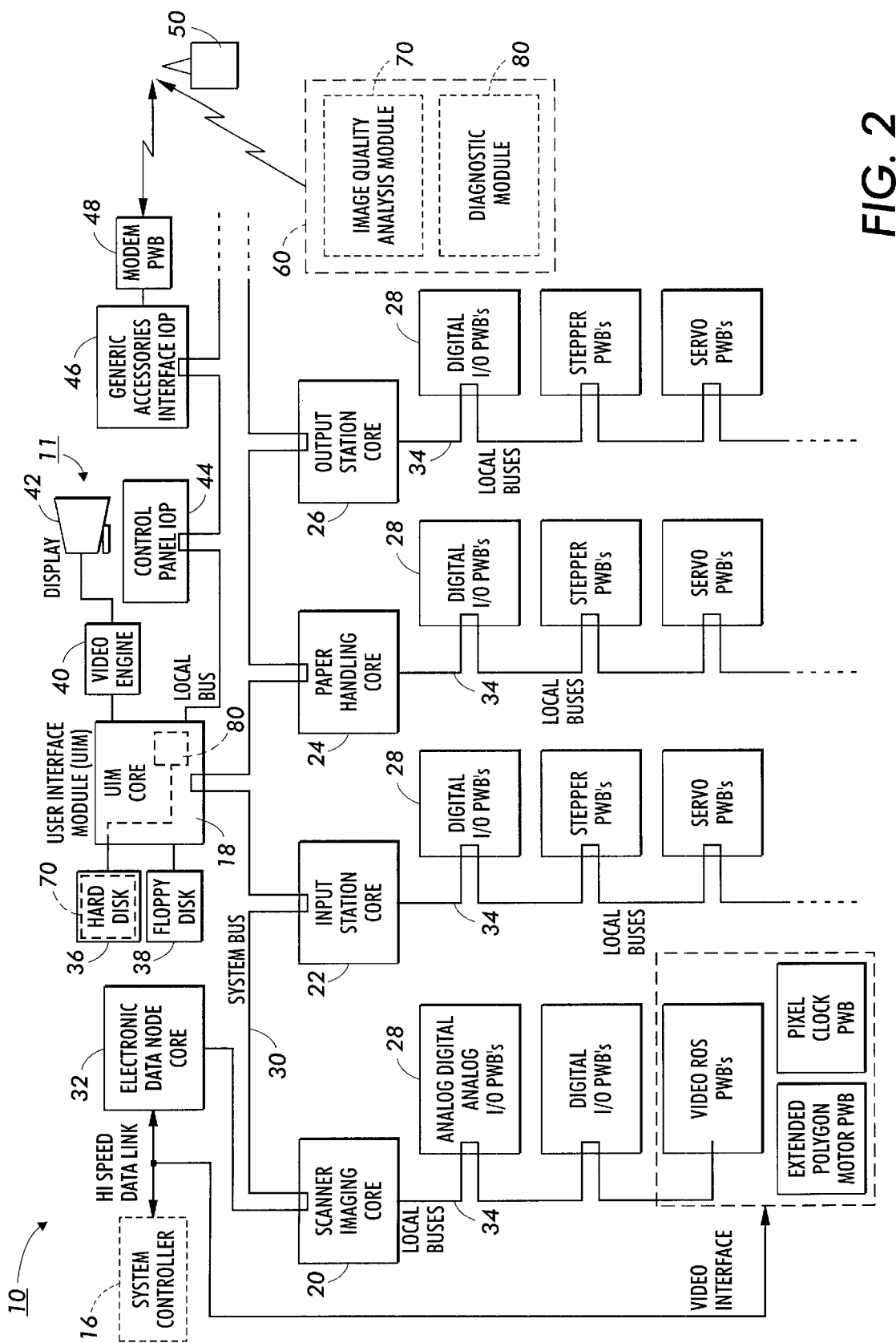
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
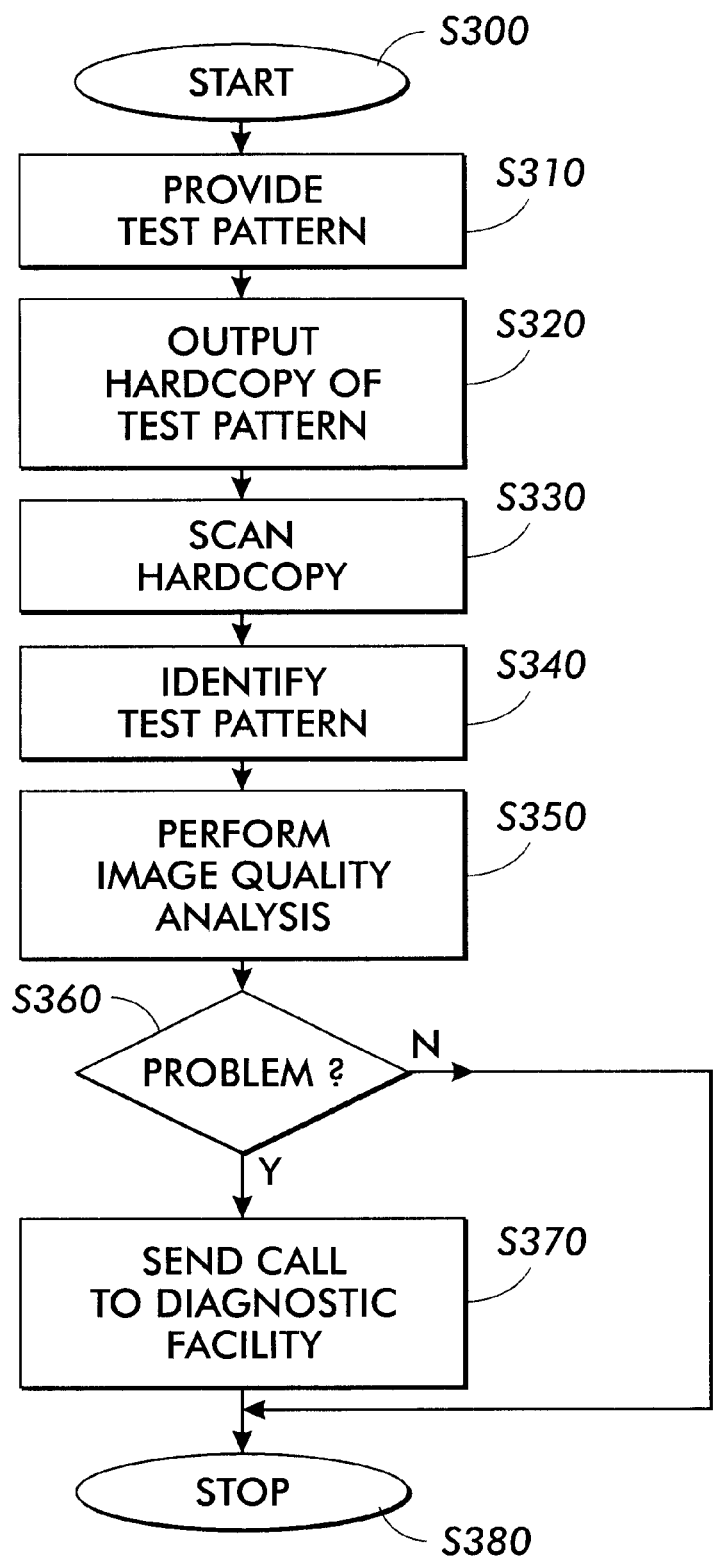
FIG. 3 is a flow chart showing an image analysis method according to the invention.

In a first embodiment of the invention, image quality analysis is performed by the process set forth in the flow chart of FIG. 3. The process starts at step S300 and advances to step S310 where at least one specific digital test pattern stored on a hard disk 36, is provided. Preferably, multiple different test patterns are used to analyze various components relevant to a determination of image quality. Flow then proceeds to step S320 where a corresponding hardcopy output of the test pattern is generated. This can be done by outputting a printed hardcopy output from output station 26 using the digital test pattern as an input. Then, flow advances to step S330 where the hardcopy output is scanned by scanner 20 to form a digital raster image for analysis purposes.

After step S330, flow advances to step S340 where the digital image is preferably acted on by pattern recognition software, which can be located within hard disk 36 or floppy disk 36 and is associated with image quality analysis module 70, to determine a precise location of various test elements within the scanned digital raster image. This software uses a Hough or similar transform to automatically detect locator marks on the image. A suitable pattern recognition system for use with the invention can be found in U.S. Pat. No. 5,642,202 to Williams et al., owned by the assignee of the present invention, the disclosure of which is incorporated herein by reference in its entirety. Alternatively, or in conjunction therewith, the test pattern may include encoded information that signifies a particular test pattern. The memory of the image analysis module 70 may also be provided with a script file corresponding to each possible test pattern or test detailing the contents of the script and associated test pattern, as well as detailing the particular image quality analysis routine to be used to measure a particular part of overall image quality. A more detailed description of such a scripted test pattern can be found in co-pending U.S. Ser. No. 09/450,182 to Rasmussen et al., filed concurrently herewith, entitled "Method to Allow Automated Image Quality Analysis of Arbitrary Test Patterns", the subject matter of which is incorporated by reference herein in its entirety.

After step S340, the process flows to step S350 where image quality analysis is performed on the test image using image quality analysis module 70. From step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Figure 4:
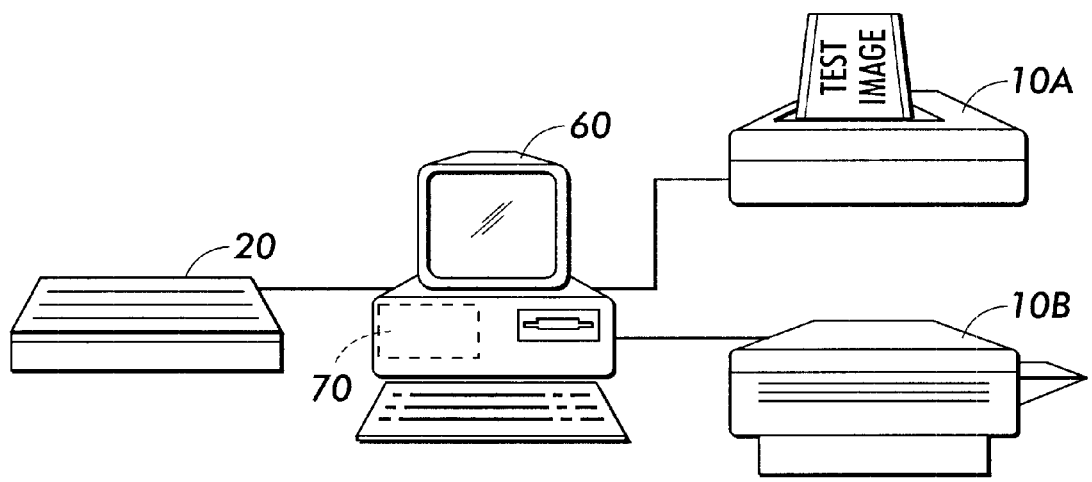
FIG. 4 is an alternative image output device and image analysis system according to the invention.

Alternatively, the image quality analysis module 70 may be remote from image output device 10. An example of which is illustrated in FIG. 4 where image output devices are in the form of printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a test pattern to generate a hardcopy output from. This hardcopy output is then placed in scanner 20 to generate the digital test image. This digital test pattern is then analyzed to determine image quality of the printer.

While shown in FIG. 4 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk and provided to a non-associated computer having the image quality analysis module.

The test pattern used in connection with determination of printer image quality can consist of one or more analytical outline font characters. Examples of such characters are provided in FIG. 5, along with types of actual characters they represent and the particular characteristics that are being tested. Each of these examples replicate a particular parameter or trait relevant to proper textual image quality and can be easily analyzed by conventional image processing techniques. The most simple analytical outline character has the form of a line. Characters with different line widths can be used and they can be reproduced at different angles, such that they efficiently can be used to test for "jaggies", that is, abrupt changes in line edge position caused by the finite resolution of the printer.

Depending on the font used to write a particular passage of text, such as Times or Helvetica, different image quality issues will be stressed. For example, a Times New Roman font is very stressful in terms of accurate reproduction of serifs, while an italicized Helvetica font will be more stressful with respect to straight reproduction of line edges without visible "jaggies" (jagged edges) that can result from limitations in printer resolution. Each particular analytical outline font character can be designed to emulate these specific fonts or traits of fonts, for example stem width and aspect ratio.

As shown in FIG. 5, an exemplary first test pattern can consist of a first analytical outline font character "AOF" having a plurality of cross lines on a wider vertical line, which stresses or is useful in determining the ability of the printer to reproduce serifs. Another "AOF" character stresses line spacings, while others stress thin lines, thin lines between larger objects, arcs, concentric circles, intersections, and the like, which are all aspects of printed text, such as English or Kanji. FIG. 5 shows the characters in enlargement. Once the analytical outline characters have been designed, they can be employed on a test pattern in different sizes, just like a regular font.

These AOF font characters can be used in visual evaluation of image quality or instrumented measurement. They are particularly suited for use in the image quality analysis system provided in co-pending U.S. Ser. No. 09/450,185 to Rasmussen et al., filed concurrently herewith, entitled "Virtual Tech Rep By Remote Image Quality Analysis", the disclosure of which is incorporated herein by reference in its entirety. That is, these AOF characters can be a part of the test pattern in step S310 of FIG. 3 and step S350 can analyze the scanned representation of such using conventional image processing techniques as discussed in FIG. 5.

For this application, as well as other image quality analysis, it is important that the IQ can be evaluated in a manner that directly correlates with the human visual impression of the uniformity. A significant step to assure correlation with human visual perception is that a Visual Transfer Function of the human visual system is taken into account. For example, see co-pending U.S. Ser. No. 09/450,184 to Rasmussen et al. filed concurrently herewith, entitled "Method to Obtain Consistent Image Quality Measurements From Different Image Input Devices", the subject matter of which is incorporated herein in its entirety by reference. As such, the image quality analysis should reflect not only the actual differences detected by image processing techniques, but should be modified to reflect which of these differences or how much of these differences would be perceived by a human viewer of the output of the particular printer, optionally allowing for simulation of close inspection or the use of a loupe.

The present invention has been described with reference to specific embodiments, which are intended to be illustrative and non-limiting. Various modifications can be made to the invention without departing from the spirit and scope of the invention as defined by the appended claims.

What is claimed is:

1. An image quality analysis system for determining image quality of printed text in an image output device, comprising:
   a test pattern pertinent to image quality determination that includes a set of analytical outline font characters, each representing a single isolated trait of an actual text font pertinent to printed text quality analysis purposes;
   a scanner that scans a hardcopy test image, which has been generated by the output device based on the test pattern, to form a digital raster image; and
   an image quality analysis module that receives the digital raster image, distinguishes one or more test targets from the digital raster image representing various ones of the analytical outline font characters, and performs image quality analysis on the test targets to obtain results quantifying image quality,
   wherein one of the analytical outline font characters includes an isolated trait relevant to accurate reproduction of serifs by providing a main stem of a predetermined width and a series of spaced perpendicular lines of a smaller width.

2. The image quality analysis system of claim 1, wherein the image quality analysis module further includes means for applying a human visual model to the digital raster image.

3. The image quality analysis system of claim 1, wherein the image quality analysis module resides locally at a site of the image output device.

4. The image quality analysis system of claim 3, wherein the image output device is a copier that contains the scanner.

5. The image quality analysis system of claim 1, further comprising a communication module that connects the image quality analysis module to a remote facility.

6. The image quality analysis system of claim 1, wherein the scanner and the image quality analysis module reside remote from the image output device.

7. The image quality analysis system of claim 1, further comprising a diagnostic module that can diagnose and correct image quality defects detected by the image quality analysis module.

8. The image quality analysis system of claim 1, wherein one of the analytical outline font characters includes an isolated trait relevant to maintaining equidistant line spacing by providing a series of equispaced and equiwidth lines.

9. The image quality analysis system of claim 1, wherein one of the analytical font characters includes an isolated trait relevant to reproducing of thin lines closely bound by larger printed objects.

10. The image quality analysis system of claim 1, wherein one of the analytical font characters includes an isolated trait relevant to reproducing concentric circles by providing at least two closely spaced concentric circles.

11. The image quality analysis system of claim 1, wherein one of the analytical font characters includes an isolated trait relevant to reproducing smooth inclined lines free from jagged edges.

12. A method of performing image quality analysis on an image output device having an output station that generates a hardcopy image from a digital image, the method comprising:
   generating a hardcopy image output from the image output device based on a predetermined test pattern, the test pattern including a set of analytical outline font characters, each representing a single isolated trait of an actual text font pertinent to printed text quality analysis purposes;
   scanning the hardcopy image using a scanner to form a digital raster image containing a copy of at least one of the analytical outline font characters; and
   performing image quality analysis on the digital raster image to obtain results quantifying image quality by analyzing individual analytical outline font characters to determine image quality of the isolated traits,
   wherein one of the analytical outline font characters includes an isolated trait relevant to accurate reproduction of serifs by providing a main stem of a predetermined width and a series of spaced perpendicular lines of a smaller width.

13. The method of claim 12, further comprising applying a human visual model to the digital raster image.

14. The method of claim 12, wherein the image quality analysis is performed locally at a site of the image output device.

15. The method of claim 14, wherein the image output device is a copier that contains the scanner.

16. The method of claim 12, wherein one of the analytical outline font characters includes an isolated trait relevant to maintaining equidistant line spacing by providing a series of equidspaced and equiwidth lines.

17. The method of claim 12, wherein one of the analytical font characters includes an isolated trait relevant to reproducing of thin lines closely bound by larger printed objects.

18. The method of claim 12, wherein one of the analytical font characters includes an isolated trait relevant to reproducing concentric circles by providing at least two closely spaced concentric circles.

19. The method of claim 12, wherein one of the analytical font characters includes an isolated trait relevant to reproducing smooth inclined lines free from jagged edges.

20. An image quality analysis system for determining image quality of printed text in an image output device, comprising:
   a test pattern pertinent to image quality determination that includes a set of analytical outline font characters, each representing a single isolated trait of an actual text font pertinent to printed text quality analysis purposes, of which
      one of the analytical outline font characters includes an isolated trait relevant to accurate reproduction of serifs by providing a main stem of a predetermined width and a series of spaced perpendicular lines of a smaller width,
      one of the analytical outline font characters includes an isolated trait relevant to maintaining equidistant line spacing by providing a series of equispaced and equiwidth lines,
      one of the analytical outline font characters includes an isolated trait relevant to reproducing thin lines closely bound by larger printed objects,
      one of the analytical outline font characters includes an isolated trait relevant to reproducing concentric circles by providing at least two closely spaced concentric circles, and one of the analytical outline font characters includes an isolated trait relevant to reproducing smooth inclined lines free from jagged edges;

a scanner that scans a hardcopy test image, which has been generated by the output device based on the test pattern, to form a digital raster image; and an image quality analysis module that receives the digital raster image, distinguishes one or more test targets from the digital raster image representing various ones of the analytical outline font characters, and performs image quality analysis on the test targets to obtain results quantifying image quality.

21. A method of performing image quality analysis on an image output device having an output station that generates a hardcopy image from a digital image, the method comprising:

generating a hardcopy image output from the image output device based on a predetermined test pattern, the test pattern including a set of analytical outline font characters, each representing a single isolated trait of an actual text font pertinent to printed text quality analysis purposes;

scanning the hardcopy image using a scanner to form a digital raster image containing a copy of at least a subset of the analytical outline font characters, of which, one of the analytical outline font characters includes an isolated trait relevant to accurate reproduction of serifs by providing a main stem of a predetermined width and a series of spaced perpendicular lines of a smaller width, one of the analytical outline font characters includes an isolated trait relevant to maintaining equidistant line spacing by providing a series of equispaced and equiwidth lines, one of the analytical outline font characters includes an isolated trait relevant to reproducing thin lines closely bound by larger printed objects, one of the analytical outline font characters includes an isolated trait relevant to reproducing concentric circles by providing at least two closely spaced concentric circles, and one of the analytical outline font characters includes an isolated trait relevant to reproducing smooth inclined lines free from jagged edges; and performing image quality analysis on the digital raster image to obtain results quantifying image quality by analyzing individual analytical outline font characters to determine image quality of the isolated traits.

* * * * *